(12) United States Patent
Ohara (10) Patent No.: US 10,661,483 B2
(45) Date of Patent: May 26, 2020

(54) TIRE VULCANIZING MOLD

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/327,014

(22) PCT Filed: Sep. 28, 2016

(86) PCT No.: PCT/JP2016/004378
§ 371 (c)(1),
(2) Date: Feb. 21, 2019

(87) PCT Pub. No.: WO2018/061050
PCT Pub. Date: Apr. 5, 2018

(65) Prior Publication Data
US 2019/0176369 A1     Jun. 13, 2019

(51) Int. Cl.
*B29D 30/06*     (2006.01)
*B29C 33/02*     (2006.01)
(Continued)

(52) U.S. Cl.
CPC .............. *B29C 33/02* (2013.01); *B29C 35/02* (2013.01); *B29D 30/0606* (2013.01); (Continued)

(58) Field of Classification Search
CPC ................ B29D 30/0606; B29D 30/72; B29D 2030/0616; B29D 2030/0617
See application file for complete search history.

(56) References Cited

U.S. PATENT DOCUMENTS 5,382,402 A *   1/1995   Espie ................... B29C 33/10
                                                                          156/394.1
6,491,854 B1 *   12/2002   Sano ..................... B22D 19/00
                                                                           164/24
(Continued)

FOREIGN PATENT DOCUMENTS

JP        63-264308      11/1988
JP        2012-135897    7/2012

OTHER PUBLICATIONS

International Search Report dated Nov. 1, 2016, issued in counterpart International Application No. PCT/JP2016/004378 (1 page).

*Primary Examiner* — James P Mackey
(74) *Attorney, Agent, or Firm* — Westerman, Hattori, Daniels & Adrian, LLP (57) ABSTRACT

A tire vulcanizing mold is disclosed capable of accurately providing a clearance, from which air existing between a green tire and a side mold is released, on a side shaping surface and thereby preventing shaping defect. The tire vulcanizing mold includes an upper and lower pair of side molds having side shaping surfaces. Each of the side molds includes a side mold main body, plural pieces, and a clearance provided between the side mold main body and each of the pieces. The side mold main body includes plural recesses, each of which is opened to the side shaping surface and an outer surface, at spaced intervals. Each of the pieces is fitted into the recess and forms the side shaping surface with the side mold main body. The clearance is opened to the side shaping surface and extends from an inner side to an outer side.

7 Claims, 9 Drawing Sheets

(51) Int. Cl.
*B29C 35/02* (2006.01)
*B29D 30/72* (2006.01)

(52) U.S. Cl.
CPC ...... *B29D 30/0629* (2013.01); *B29D 30/0662* (2013.01); *B29D 30/72* (2013.01); *B29D 2030/0616* (2013.01); *B29D 2030/0617* (2013.01); *B29D 2030/0618* (2013.01)

(56) References Cited

U.S. PATENT DOCUMENTS

| | | | | |
|---|---|---|---|---|
| 7,021,914 | B2* | 4/2006 | Hanya | B29C 33/10 |
| | | | | 249/141 |
| 2007/0259063 | A1* | 11/2007 | Tanaka | B29C 33/10 |
| | | | | 425/36 |

* cited by examiner

TIRE VULCANIZING MOLD

TECHNICAL FIELD

The present invention relates to a tire vulcanizing mold.

BACKGROUND ART

A tire is manufactured by building an unvulcanized green tire and vulcanizing and shaping the green tire in a specified shape by using a tire vulcanizing mold.

The tire vulcanizing mold including: a tread mold having a tread shaping surface for shaping a tread of the tire; an upper and lower pair of side molds, each of which has a side shaping surface for shaping a sidewall of the tire; and an upper and lower pair of bead rings, each of which has a bead shaping surface for shaping a bead of the tire has been known.

It has been known that shaping defect occurs in such a tire vulcanizing mold. The shaping defect is formation of a dent (an uplift) or the like on an outer surface of the tire due to retention of air between the green tire and the tire vulcanizing mold. Such shaping defect is likely to occur on a side surface of the tire including the sidewall where a rubber volume is relatively small.

To handle such a problem, a tire vulcanizing mold has been proposed in PTL 1. The tire vulcanizing mold is formed with the ring-shaped side mold by arranging plural side segments, which are divided in a tire circumferential direction, in the tire circumferential direction. In this tire vulcanizing mold, plural clearances, each of which extends in a tire radial direction, are formed on the side shaping surface by using mating surfaces of the side segments, and the air existing between the green tire and the side mold is released from each of these clearances.

CITATION LIST

Patent Literature

PTL 1: JP-A-2012-135897

SUMMARY OF INVENTION

Technical Problem

However, in the tire vulcanizing mold as described above, the side mold, which includes the formed by coupling the plural side segments. Thus, a dimension error existing in each of the side segments and an assembly error generated at the time of coupling the side segments are accumulated. As a result, it becomes difficult to accurately provide the clearances, from which the air existing between the green tire and the side mold is released, on the side shaping surface and causes such a problem of the shaping defect that the rubber spills out of the excessively large clearance, that the dent is formed on the outer surface of the tire due to insufficient air releasing performance resulted from the excessively small clearance, or the like.

The present invention has been made in view of the above point and therefore has a purpose of providing a tire vulcanizing mold capable of accurately providing a clearance, from which air existing between a green tire and a side mold is released, on a side shaping surface and thereby preventing shaping defect.

Solution to Problem

A tire vulcanizing mold according to the present invention is a tire vulcanizing mold that vulcanizes and shapes a tire, and includes: an upper and lower pair of side molds, each of which has a side shaping surface for shaping a sidewall of the tire. The side mold includes a side mold main body, plural pieces, and a clearance formed between the side mold main body and each of the pieces. The side mold main body includes plural recesses, each of which is opened to the side shaping surface and an outer surface in a tire radial direction, at spaced intervals in a tire circumferential direction. Each of the pieces is fitted into the recess, and forms the side shaping surface with the side mold main body. The clearance is opened to the side shaping surface and extends from an inner side to an outer side in the tire radial direction.

In a preferred aspect of the present invention, the side shaping surface may include a groove that is provided to overlap the clearance.

In another preferred aspect, the pieces may include two or more types of the pieces that have different lengths in the tire circumferential direction.

In yet another preferred aspect, the side mold main body may include: a base in a flat plate shape; a projection that is projected from the base at a position between the adjacent recesses in the tire circumferential direction; and a slit that penetrates a bottom of the recess in a thickness direction of the base and overlaps the clearance. In this case, the slit is preferably longer than the recess in the tire radial direction.

In further another preferred aspect, the side shaping surface may include a recessed groove or a projection in a linear shape, and the clearance may be provided in parallel with the recessed groove or the projection.

In further another preferred aspect, the recess may have an erroneous attachment preventing shape that allows one of the plural pieces to be fitted into the recess and prevents the other piece from being fitted into the recess.

Advantageous Effects of Invention

In the tire vulcanizing mold according to this embodiment, each of the plural pieces is fitted into the recess provided in the side mold main body and forms the side shaping surface, and the pieces are not directly coupled to each other. Thus, on the side shaping surface, the clearance, from which the air is released, can accurately be provided between the side mold main body and each of the pieces. Therefore, shaping defect can be prevented.

DESCRIPTION OF EMBODIMENTS

First Embodiment

A description will hereinafter be made on a first embodiment with reference to the drawings.

Figure 1:
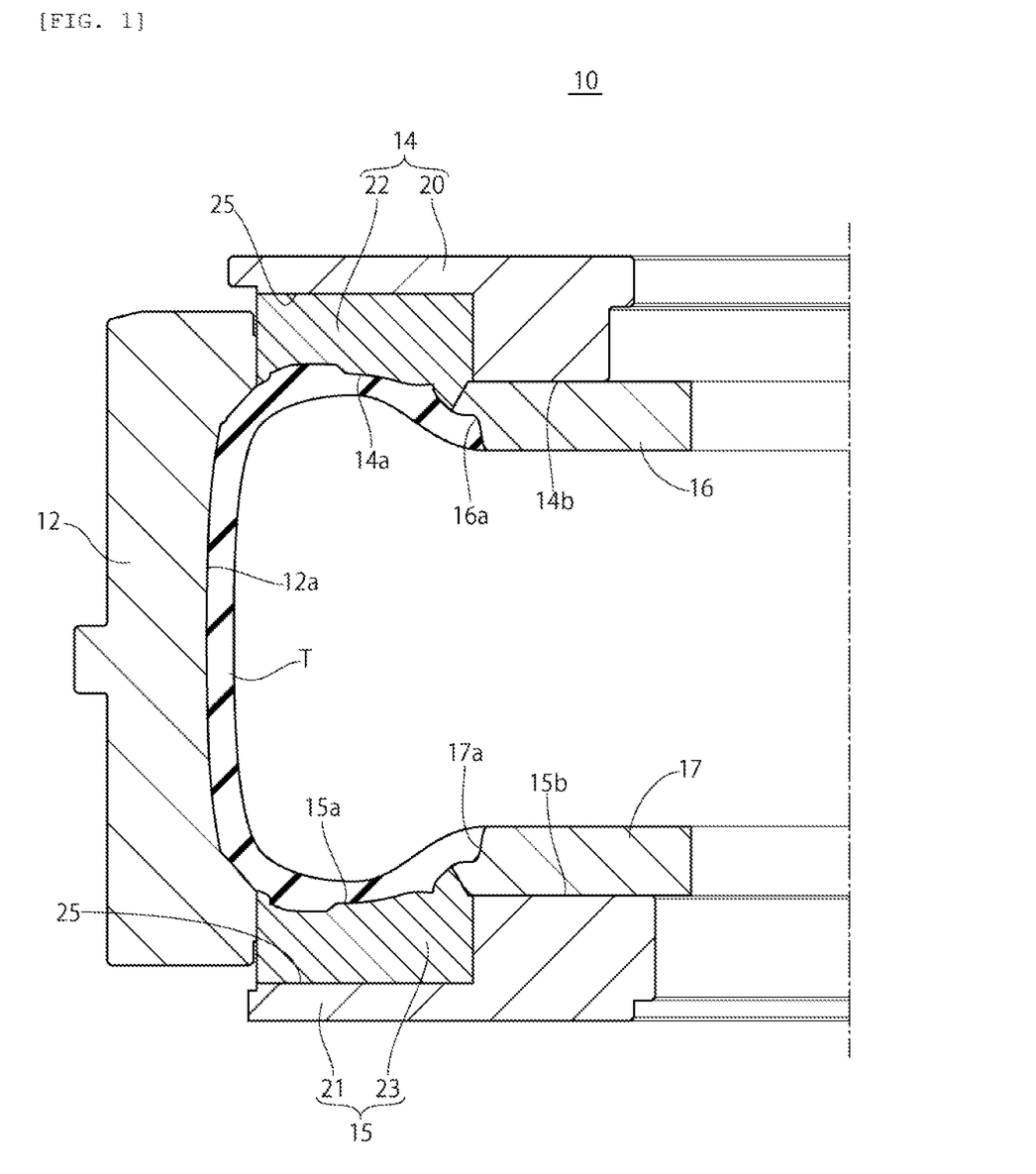
FIG. 1 is a cross-sectional view of a tire vulcanizing mold according to a first embodiment.

FIG. 1 is a cross-sectional view of a tire vulcanizing mold 10 according to this embodiment. This tire vulcanizing mold 10 is a shaping mold used to heat and pressurize an unvulcanized green tire T for vulcanization molding, and the unvulcanized green tire T is set in the tire vulcanizing mold 10 such that a tire axial direction is vertically arranged. The tire vulcanizing mold 10 includes a tread mold 12, an upper and lower pair of side molds 14, 15, and an upper and lower pair of bead rings 16, 17.

The tread mold 12 is a mold having a tread shaping surface 12a that shapes a tread of a tire. The tread mold 12 includes plural sectors that are divided in a tire circumferential direction. The plural sectors are provided such that each thereof can be displaced in a manner to increase/reduce a diameter in a tire radiation direction (a tire radial direction). In a mold closed state where each of the sectors is arranged at a mold closed position, the adjacent sectors in the tire circumferential direction gather to have a ring shape.

The upper side mold 14 located above the green tire T is a ring-shaped mold having a side shaping surface 14a that shapes an upper sidewall of the green tire T. The lower side mold 15 located below the green tire T is a ring-shaped mold having a side shaping surface 15a that shapes a lower sidewall of the green tire T.

The bead ring b is an upper bead that is placed on a bead ring fixing section 14b of the upper side mold 14 and is fixed thereto by a bolt or the like. The upper bead ring 15 is a mold having a bead shaping surface 16a that shapes an upper bead of the green tire T.

The bead ring 17 is a lower bead ring that is placed on bead ring fixing section 15b of the lower side mold 15 and is fixed thereto bye a bolt or the like. The lower bead ring 17 is a mold having a bead shaping surface 17a that shapes a lower bead of the green tire T.

Figure 2:
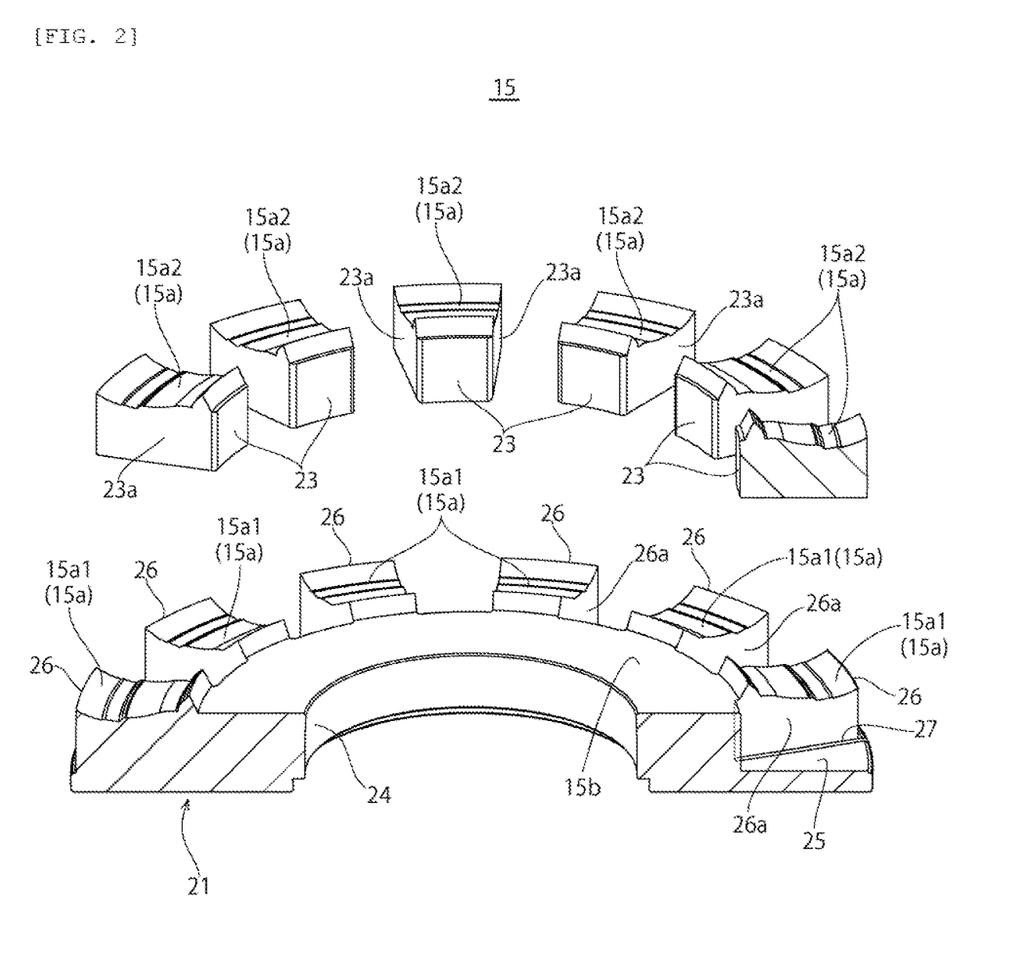
FIG. 2 is a perspective cross-sectional view illustrating a side mold in an exploded manner.

FIG. 2 is a perspective cross-sectional view illustrating the lower side mold 15 in an exploded manner. In the upper side mold 14 and the lower de mold 15, the side shaping surface 14a and the side shaping surface 15a possibly have mutually different shapes. However the upper side mold 14 and the lower side mold 15 have the same basic configuration to include side mold main bodies 20, 21, pieces 22, 23, and clearances 28, 29. Thus, a description will herein be made on the lower side mold 1 and a detailed description on the upper side mold 14 will not be made.

The lower side mold 15 includes the side mold main body 21, the plural pieces 23, and the clearance 29 provided between the side mold main body 21 and each of the pieces 23.

The side mold main body 21 has a base ring shape that is made of a metallic material such as aluminum, an aluminum alloy, or iron. On an inner side of the base in the tire radial direction, the head ring fixing section 15b, which fixes the bead ring 17, is provided. On an outer side of the base 24 in the tire radial direction, plural recesses 25 are provided with a space being interposed therebetween in the tire circumferential direction, and plural projections 25 are each provided between the adjacent recesses 25 in the tire circumferential direction in a manner to be projected upward from the base 24.

Each of the recesses 25 is a dent that is opened in a fan shape to the side shaping surface 15a in a plan (when seen in a tire rotational axis direction). The piece 23 is fitted into each of the recesses 25. An outer side of each of the recesses 25 in the tire radial direction is opened to an outer surface of the base 24 in the tire radial direction. An inner side of the recess 25 in the tire radial direction extends to the bead ring fixing section 15b and is covered from above with the bead ring 17, which is fixed to the bead ring fixing section 15b.

Figure 3:
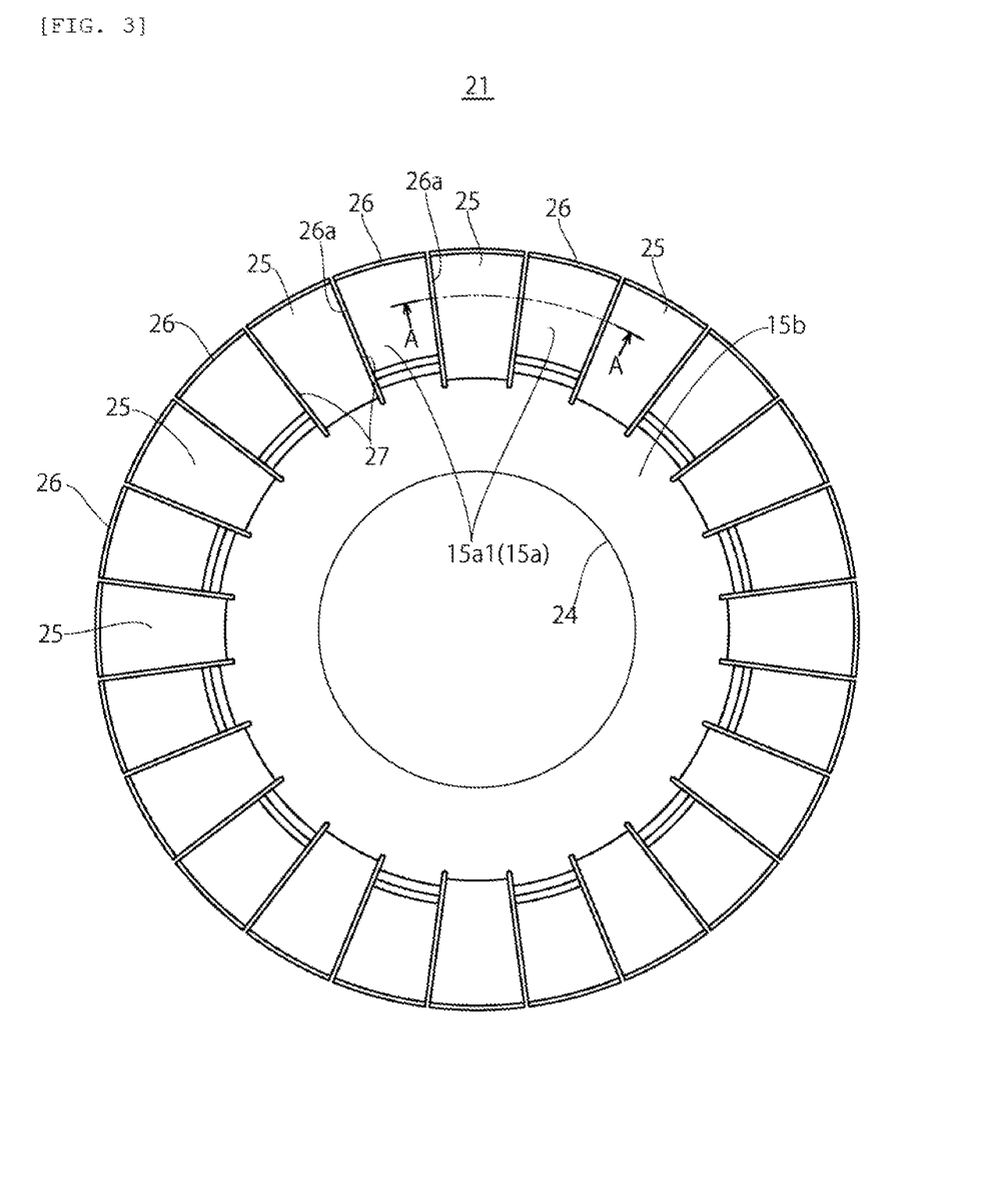
FIG. 3 is a plan view of a side mold main body.

Slits 27, each of which penetrates the base 24 in a thickness direction (an up-down direction), are provided on a bottom surface of the recess 25. Each of the slits 27 is provided to be wider than the clearance 29 provided between the side mold main body 21 and each of the pieces 23. As illustrated in FIG. 3, each of the slits 27 is a cut extending in the tire radial direction along a circumferential wail 26a, which partitions the recess 25 in the tire circumferential direction. An outer side of each of the slits 27 in the tire radial direction is opened to the outer surface of the base 24 in the tire radial direction, and an inner side thereof in the tire radial direction extends inward in the tire radial direction beyond the recess 25.

Each of the projections 26 is projected radially outward in the tire radial direction from the bead ring fixing section 15b. In this embodiment, each of the circumferential walls 26a is provided corresponding to the tire radial direction, and each of the projections 26 has the fan shape in the plan view. On an upper surface of each of the projections 26, a part 15a1 that constitutes a part of the side shaping surface 15a is provided.

Figure 5:
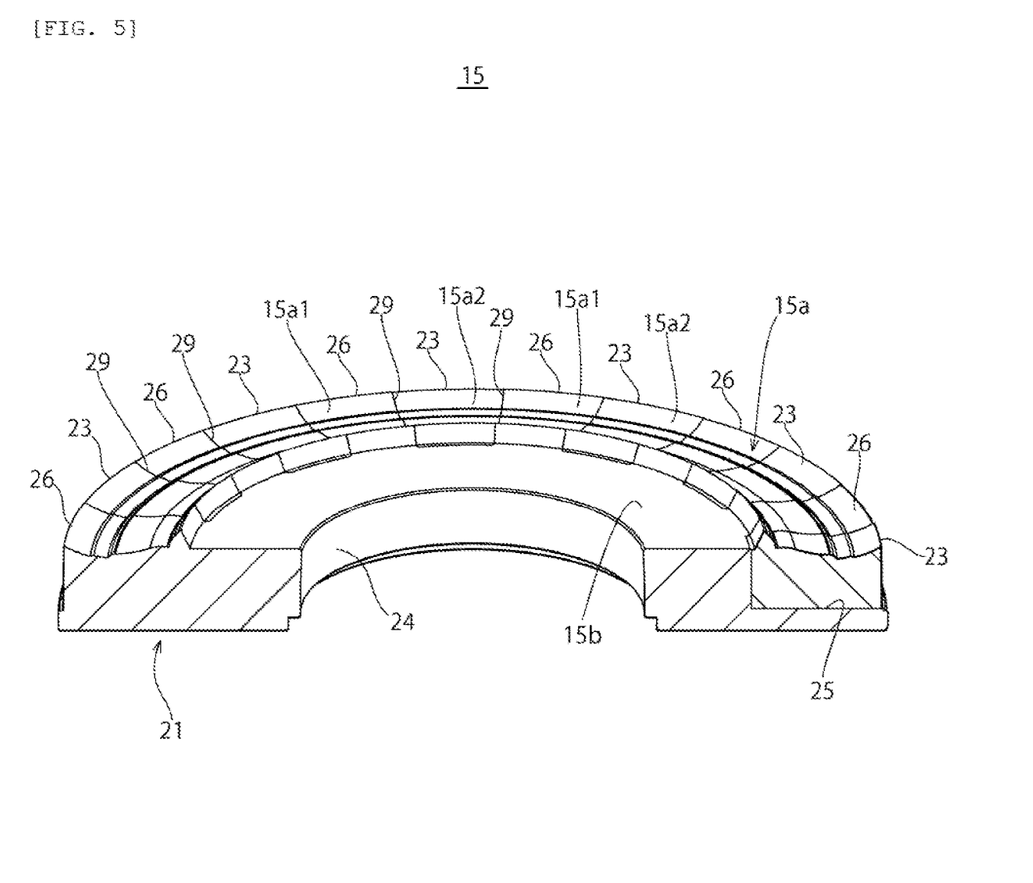
FIG. 5 is a perspective cross-sectional view of the side mold.

Each of the pieces 23 is formed of the same metallic material as the side mold main body 21, such as aluminum, the aluminum alloy, or iron. Each of the pieces 23 is fitted into the recess 25 of the side mold main body 21. Together with the side mold main body 21, the pieces 23 form the ring-shaped lower side mold 15 as illustrated in FIG. 5. Each of the pieces 23, which is fitted into the recess 25, is fixed to the side mold main body 21 by a bolt or the like. In this embodiment, all of the plural pieces 23 are provided to have equal lengths in the tire circumferential direction.

An upper surface of each of the pieces 23 constitutes a part 15a2 of the side shaping surface 15a. Together with the side shaping surfaces 15a1 provided in the projections 26 of the side mold main body 21, the upper surfaces of the pieces 23 form the side shaping surface 15a that continues in the tire circumferential direction with the clearance 29 being interposed between each of the side shaping surfaces 15a1 and each of the parts 15a2.

Each of the pieces 23 is provided such that a length thereof in the tire circumferential direction is slightly less than a length of each of the recesses 25. Thus, in a state where each of the pieces 23 is fitted into the recess 25, each of the clearances 29, which extends from the inner side to the outer side in the tire radial direction, is provided between a circumferential wall 23a of the piece 23 and the circumferential wall 26a of the projection 26 opposing in the tire circumferential direction.

Each of the clearances 29 provided between the pieces 23 and the projections 26 has: an upper end that is opened to the side shaping surface 15a; and a lower end that opposes the slit 27 provided at a bottom of the recess 25 and is connected to the slit 27. In this example, each of the slit 27 is provided along the circumferential wall 26a that partitions the recess 25 in the tire circumferential direction. Thus, each of the entire clearances 25 vertically overlaps the slit 27 in the tire radial direction and is connected to the slit 27.

Each of these clearance 25 is an air releasing clearance, from which air existing between the green tire T and the lower side mold 15 is released to the outside, and a dimension of each of these clearances 25 on the side shaping surface 15a is set such that the air flows therethrough but unvulcanized rubber does not enter. As an example, a width of each of the clearances 29 on the side shaping surface 15a (a distance between the circumferential wall 23a of the piece 23 and the circumferential wall 26a of the projection 26) is preferably equal to or less than 0.05 mm, may be 0.01 to 0.05 mm, and may further be 0.01 to 0.03 mm.

Each of the slits 27 is connected to an air releasing path, which is not illustrated, and the air existing between the green tire T and the lower side mold 15 flows into the air releasing path through the clearances 29 and the slits 27 and is released to the outside of the tire vulcanizing mold.

Figure 4:
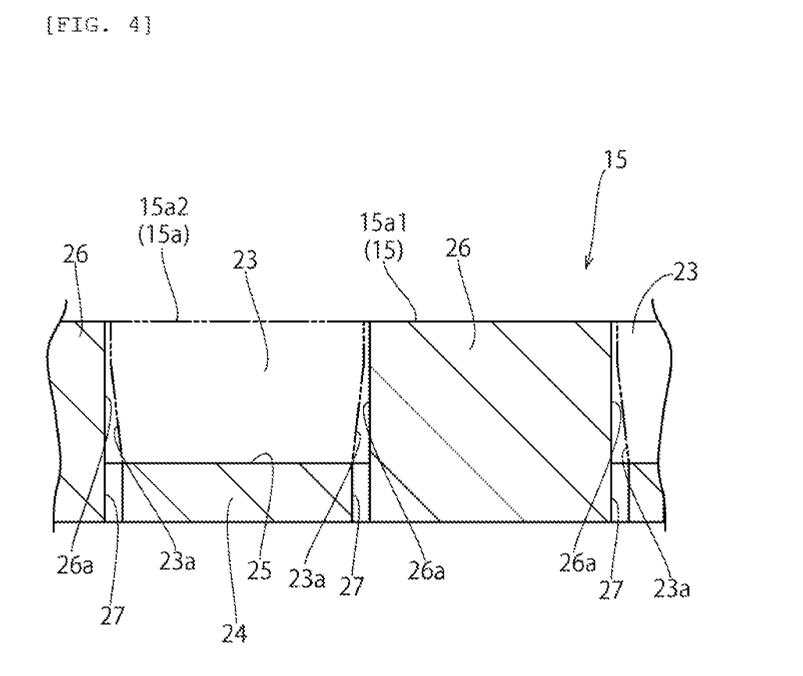
FIG. 4 is a cross-sectional view taken along A-A in FIG. 3.

As illustrated in FIG. 4, each of the pieces 23 is provided such that an upper portion thereof (a portion on the side shaping surface 15a2 side) has a constant length in the tire circumferential direction. Meanwhile, the circumferential walls 23a of each of the pieces 23 are bent such that lengths in the tire circumferential direction of a central portion and a lower portion of the piece 23 in the up-down direction are gradually reduced downward. In this way, the width of an upper portion of each of the clearances 29 is set to such a dimension that the air flows therethrough but the unvulcanized rubber does not enter. The width of each of the clearances 29 is gradually increased from a central portion to a lower portion in the up-down direction, and the width of a lower end of each of the clearances 29 is equal to the width of the slit 27 provided at the bottom of the recess 25.

In the tire vulcanizing mold 10 having the configuration as described above, the lower side mold 15 includes: the side mold main body 21; the pieces 23, each of which is fitted into the recess 25; and the clearances 29, each of which is provided between the projection 26 and the piece 23 and is opened to the side shaping surface 15a. Thus, the air existing between the green tire T and the lower side mold 15 can be released to the outside from the clearances 29. Therefore, shaping defect caused by retention of the air in the tire vulcanizing mold 10 can be prevented.

The side mold 15 is configured by combining the plural pieces 23. All of the pieces 23 are fixed to the side mold main body 21, and an attachment position error that is generated when the plural pieces 23 are fixed is not accumulated. Thus, the pieces 23 can be attached with a high degree of positioning accuracy. Therefore, the width dimension of each of the clearances 29, which are provided between the projections 26 of the side mold main body 21 and the pieces 23, can be set with the high degree of accuracy.

In this embodiment, the width dimension of each of the clearances 29 can easily and accurately be set by fitting each of the pieces 23 into the recess 25 of the side mold main body 21, fixing each of the pieces 23 to the side mold main body 21 by the bolt or the like in a state where a tape-like spacer having a specified width and called a shim tape is held between each of the circumferential walls 26a of the projections 26 and each of the circumferential walls 23a of the pieces 23, and thereafter removing the spacers to assemble the side mold 15.

In the embodiment, due to provision of the slits 27 in the side mold main body 21, each of which vertically overlaps the clearance 29 in the entire tire radial direction, the spacer can easily be removed from each of the clearances 29, which are provided between the projections 26 of the side mold main body 21 and the pieces 23, during the assembly of the side mold 15.

When the green tires T are repeatedly vulcanized and shaped, a contaminant in gas that is produced during vulcanization molding is accumulated in the clearances 29 of the side mold 15. Thus, the side mold 15 has to be cleaned periodically. In this embodiment, each of the slits 27 provided in the side mold main body 21 is provided in the manner to overlap the clearance 29. Thus, the contaminant accumulated in the clearances 29 can easily be removed by inserting a cleaning sheet having a specified thickness such as of the spacer, which is used during the assembly of the side mold 15, in the slits 27 and the clearances 29.

Furthermore, each of the slits 27 provided in the side mold main body 21 is longer in the tire radial direction than the recess 25, into which the piece 23 is fitted. Thus, a portion near a corner of each of the recesses 25, cleaning of which is difficult, can easily be cleaned by inserting the cleaning sheet therein.

Second Embodiment

Figure 6:
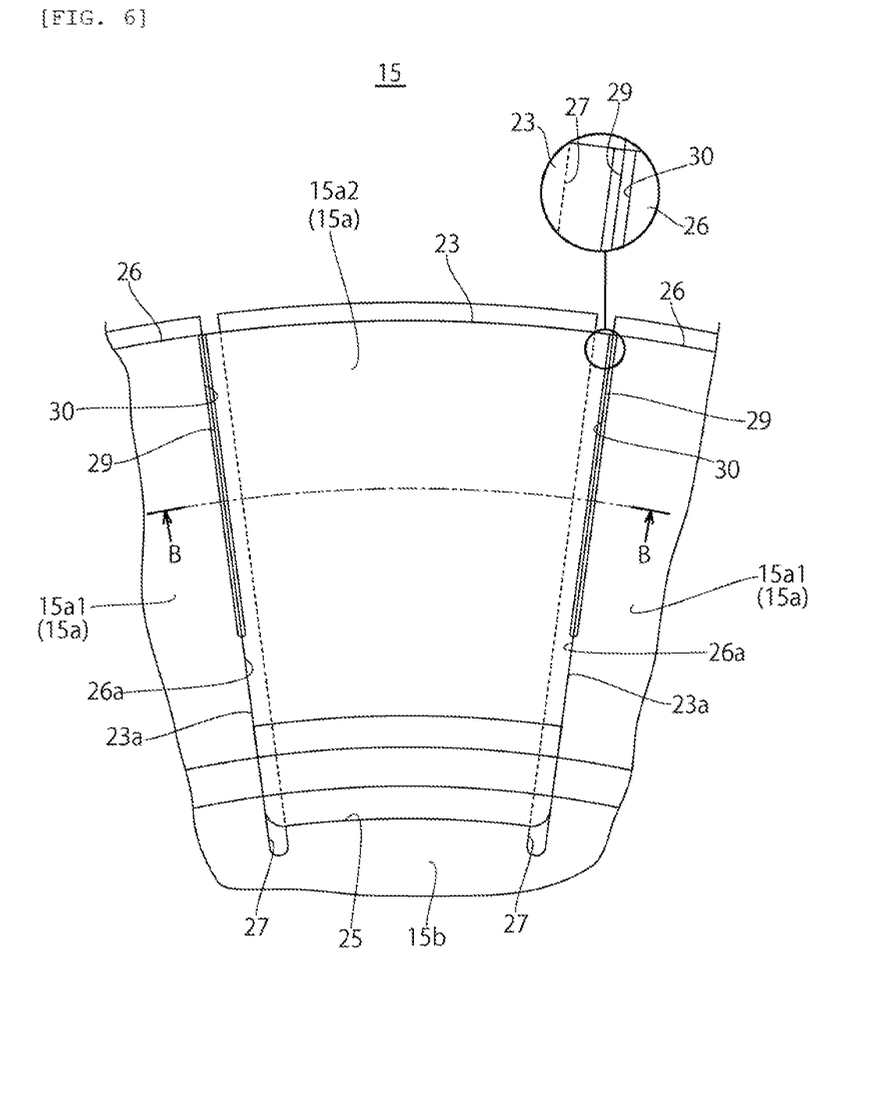
FIG. 6 is an enlarged plan view of a main section of a side mold in a tire vulcanizing mold according to a second embodiment.
Figure 7:
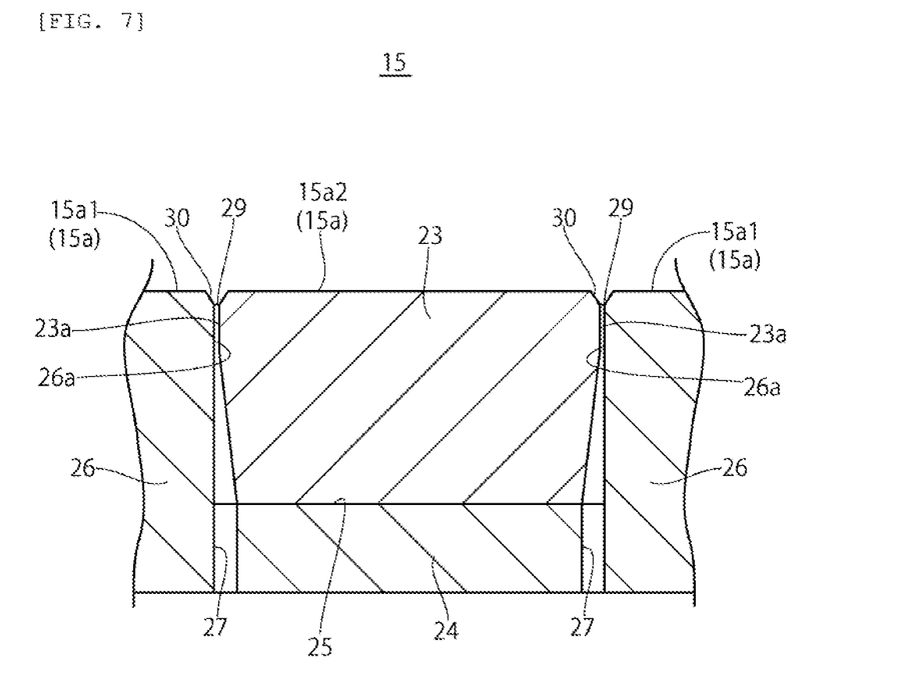
FIG. 7 is a cross-sectional view taken along B-B in FIG. 7.

A description will be made on a second embodiment of the present invention with reference to FIG. 6 and FIG. 7. The same components as those in the above first embodiment will be denoted by the same reference signs, and the detailed description thereon will not made.

In the first embodiment described above, the upper end of each of the clearances 29, which are provided between the pieces 23 and the projections 26, is set to such a dimension that the air flows therethrough but the unvulcanized rubber does not enter. However, as illustrated in FIG. 6 and FIG. 7, a groove 30 that is wider than the clearance 29 may be provided on the side shaping surface 15a in a manner to overlap the clearance 29. This groove 30 is also called a saw-cut or a serration, has a triangular shape whose cross-sectional shape is narrowed downward, for example, and is a thin groove having a groove width of 0.3 mm to 1 mm and a groove depth of 90% to 180% of the groove width.

According to this embodiment, the groove 30, which is wider than the clearance 29, is provided along the clearance 29 on the side shaping surface 15a in the manner to overlap the clearance 29. Thus, the air existing between the green tire T and the lower side mold 15 is easily released to the outside. Therefore, the shaping defect can be prevented. In addition, the tire, which is shaped by the tire vulcanizing mold 10 accord to this embodiment, is formed with a projection pattern formed by the grooves 30 at positions corresponding to the clearances 29 provided between the pieces 23 and the projections 26. Thus, even in the case where the rubber spills into the clearance 29 from the side shaping surface 15a, the rubber, which has spilled, becomes less conspicuous by the projection pattern formed by the grooves 30. Therefore, external appearance quality is not deteriorated.

The groove 30 can have any cross-sectional shape. However, the groove 30 preferably has the cross-sectional shape, such as the above-described triangular shape, a rectangular shape, a U shape, or a semicircular shape, that is narrowed toward the clearance 29 (downward).

Third Embodiment

Figure 8:
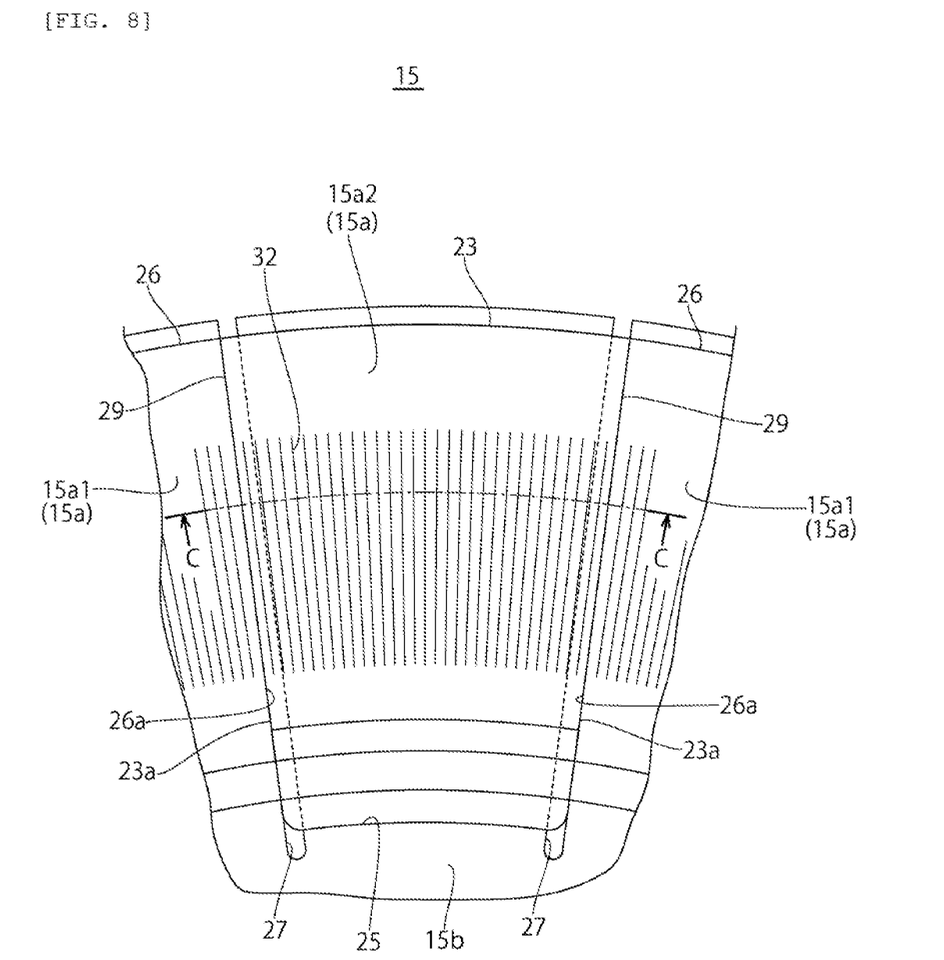
FIG. 8 is an enlarged plan view of a main section of a side mold in a tire vulcanizing mold according to a third embodiment.
Figure 9:
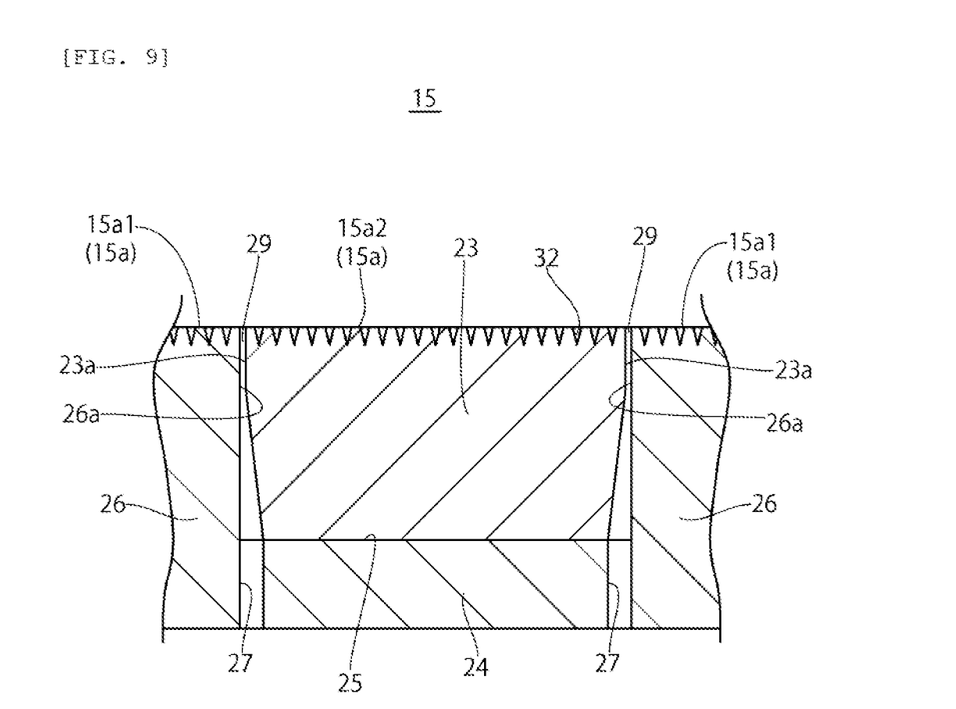
FIG. 9 is a cross-sectional view taken along C-C in FIG. 8.

A description will be made on a third embodiment the present invention with reference to FIG. 8 and FIG. 9. The same components as those in the above first and second embodiments will be denoted by the same reference signs, and the detailed description thereon will not made.

In this embodiment, the side shaping surface 15a provided with plural recessed grooves 32, each of which extends in parallel with the clearance 29, at positions near the clearance 29 formed between the piece 23 and the projection 26. In at least a portion of the side shaping surface 15*a*, the plural recessed grooves 32 are provided in parallel with each other and form a linear decorative pattern on the sidewall of the tire.

According to this embodiment, the recessed grooves 32, which form the linear decorative pattern o the sidewall of the tire, are provided in parallel with the clearance 29 at the positions near the clearance 29 provided between the piece 23 and the projection 26. Thus, even in the case where the rubber spills into the clearance 29, the rubber, which has spilled, becomes less conspicuous by the decorative pattern formed by the recessed grooves 32. Therefore, the external appearance quality is not deteriorated.

In this embodiment, the description has been made on the case where, as a pattern forming section that forms the linear decorative pattern on the sidewall, the plural recessed grooves 32 are provided in parallel with the clearance 29 at the positions near the clearance 29 of the side shaping surface 15*a*. However, instead of the plural recessed grooves 32, a single recessed groove, one or more projections, or a linear portion having a character or a pictorial figure may be provided in parallel with the clearance 29 at the position near the clearance 29.

Fourth Embodiment

A description will be made on a fourth embodiment of the present invention. A detailed description will not be made on the same configuration as those in the above first to third embodiments.

In the first to third embodiments described above, the description has been made on the case where the pieces 23 have the same lengths in the tire circumferential direction. However, plural types of the pieces 23 having the different lengths in the tire circumferential direction may exist.

In this embodiment just as described, a degree of freedom in arrangement of the clearance 29, which is provided between the piece 23 and the projection 26, is increased. Thus, in the case where the pattern forming section, which forms the pattern such as of the character or the pictorial figure on the sidewall of the tire, is provided on the side shaping surface 15*a*, the pattern forming section is less likely to be divided by the clearance 29.

Fifth Embodiment

A description will be made on a fifth embodiment of the present invention. A detailed description will not be made on the same, configuration as those in the above first to fourth embodiments.

In this embodiment, the recess 25 of the side mold main body 21 has an erroneous attachment preventing shape including a corrugated shape, into which only the specified piece 23 is fitted and the other piece 23 is not fitted.

In this embodiment just as described, the plural pieces 23 can be fitted into the specified recesses 25. Thus, erroneous attachment of the pieces 23 can be prevented.

Other Embodiments

In the first to fifth embodiment, the description has been made on the tire vulcanizing mold 10, in which the clearance 29 provided between the piece 23 and the projection 26 extends linearly in the manner to correspond to the tire radial direction. However, the present invention is not limited thereto. The clearance 29 may extend in a tilted direction with respect to the tire radial direction. Alternatively, the clearance 29 may extend in a curved shape from the inner side to the outer side in the tire radial direction.

The several embodiments of the present invention have been described so far. These embodiments are merely provided as examples and thus have no intention of limiting the scope of the invention. These novel embodiments can be implemented in any of various other aspects, and various types of elimination, replacement, and changes can be made thereto within the scope that does not depart from the gist of the invention. These embodiments and the modifications thereof are included in the scope and the gist of the invention and are also included in the invention described in the claims and the equivalent scope thereof.

REFERENCE SIGNS LIST

10: Tire vulcanizing mold
14: Side mold
15: Side mold
15*a*: Side shaping surface
15*b*: Bead ring fixing section
17: B ad ring
17*a*: Bead shaping surface
21: Side mold main body
23: Piece
23*a*: Circumferential wall
24: Base
25: Recess
26: Projection
26*a*: Circumferential wall
27: Slit
29: Clearance
30: Groove
32: Recessed groove
T: Green tire

The invention claimed is:

1. A tire vulcanizing mold that vulcanizes and shapes a tire, the tire vulcanizing mold comprising:
  an upper and lower pair of side molds, each of which has a side shaping surface for shaping a sidewall of the tire, wherein
  each of the side molds includes a side mold main body, plural pieces, and a clearance formed between the side mold main body and each of the pieces,
  the side mold main body includes plural recesses, each of which is opened to the side shaping surface and an outer surface in a tire radial direction, at spaced intervals in a tire circumferential direction,
  each of the pieces is fitted into the recess and forms the side shaping surface with the side mold main body, and
  the clearance is opened to the side shaping surface and extends from an inner side to an outer side in the tire radial direction.

2. The tire vulcanizing mold according to claim 1, wherein the side shaping surface includes a groove that is provided to overlap the clearance.

3. The tire vulcanizing mold according to claim 1, wherein
  the pieces include two or more types of the pieces that have different lengths in the tire circumferential direction.

4. The tire vulcanizing mold according to claim 1, wherein
  the side mold main body includes: a base in a flat plate shape; a projection that is projected from the base at a position between the adjacent recesses in the tire circumferential direction; and a slit that penetrates a bottom of the recess in a thickness direction of the base and overlaps the clearance.

5. The tire vulcanizing mold according to claim 4, wherein the slit is longer than the recess in the tire radial direction.

6. The tire vulcanizing mold according to claim 1, wherein
the side shaping surface includes a recessed groove or a projection in a linear shape, and
the clearance is provided in parallel with the recessed groove or the projection.

7. The tire vulcanizing mold according to claim 1, wherein
at least one of the recesses has an erroneous attachment preventing shape that allows one of the plural, pieces to be fitted into the at least one recesses and prevents another from being fitted into the at least one recess.

* * * * *